(12) United States Patent
Gandhiraju

(10) Patent No.: US 7,582,223 B2
(45) Date of Patent: Sep. 1, 2009

(54) REFRIGERANT COMPOSITION FOR REFRIGERATION SYSTEMS

(75) Inventor: Venkatarathanam Gandhiraju, Chennai (IN)

(73) Assignee: Indian Institute of Technology, Chennai (IN)

( * ) Notice: Subject to any disclaimer, the term of this patent is extended or adjusted under 35 U.S.C. 154(b) by 0 days.

(21) Appl. No.: 11/851,100

(22) Filed: Sep. 6, 2007

(65) Prior Publication Data

US 2008/0053145 A1 Mar. 6, 2008

Related U.S. Application Data

(62) Division of application No. 11/331,824, filed as application No. PCT/IB2004/002283 on Jul. 14, 2004, now abandoned.

(51) Int. Cl.
*C09K 5/04* (2006.01)
(52) U.S. Cl. ........................................ 252/68
(58) Field of Classification Search ............... 252/68
See application file for complete search history.

(56) References Cited

U.S. PATENT DOCUMENTS

| | | | |
|---|---|---|---|
| 5,441,658 A | | 8/1995 | Boyarsky et al. |
| 5,706,663 A | | 1/1998 | Boiarski et al. |
| 5,875,651 A | * | 3/1999 | Hill et al. ............ 62/511 |
| 6,463,744 B1 | * | 10/2002 | Alexeev et al. ............ 62/6 |
| 6,513,338 B1 | | 2/2003 | Alexeev et al. |
| 2006/0186370 A1 | | 8/2006 | Gandhiraju |

FOREIGN PATENT DOCUMENTS

| GB | 1336892 | 11/1973 |
|---|---|---|
| GB | 1336982 | 11/1973 |

OTHER PUBLICATIONS

"U.S. Appl. No. 11/331,824, Amendment and Response filed Apr. 24, 2007 to Non-Final Office Action mailed Jan. 4, 2007", 8 pgs.
"U.S. Appl. No. 11/331,824, Non-Final Office Action mailed Jan. 4, 2007", 5 pgs.
"U.S. Appl. No. 11/331,824, Office Communication mailed Jun. 5, 2007", 4 pgs.
"U.S. Appl. No. 11/331,824, Request for Continued Examination filed Jul. 3, 2007 to Non-Final Office Action mailed Jan. 4, 2007 and Office Communication mailed Jun. 5, 2007", 8 pgs.
"International Application Serial No. PCT/IB2004/002283, International Search Report mailed Nov. 18, 2004", 3 pgs.
"International Application Serial No. PCT/IB2004/002283, Written Opinion mailed Nov. 18, 2004", 4 pgs.

* cited by examiner

*Primary Examiner*—John R Hardee
(74) *Attorney, Agent, or Firm*—Schwegman, Lundberg & Woessner, P.A.

(57) ABSTRACT

The present invention relates to a method of refrigeration using refrigerant composition for multistage refrigeration systems, such as a pre-cooled mixed refrigeration system with one or more phase separators. The refrigerant composition can include nitrogen; methane; ethane, ethylene, or combinations thereof; propane, n-butane, iso-butane, or combinations thereof; and neon, helium, or combinations thereof.

6 Claims, 1 Drawing Sheet

REFRIGERANT COMPOSITION FOR REFRIGERATION SYSTEMS

CROSS-REFERENCE TO RELATED APPLICATION

The present application is a divisional application from U.S. Ser. No. 11/331,824, filed Jan. 16, 2006 now abandoned, and published as US 2006/0186370 on Aug. 24, 2006, which was filed as a continuation of PCT/IB04/02283, filed Jul. 14, 2004, and published as WO 2005/005569 on Jan. 20, 2005. The present application claims the priority of these prior applications, which are incorporated herein by reference in their entireties.

FIELD OF THE INVENTION

The present invention relates to a refrigerant composition for refrigeration systems, more particularly precooled mixed refrigeration systems with phase separators. Further, the present invention describes the process for refrigeration using the said refrigerant composition.

BACKGROUND OF THE INVENTION

Simple refrigeration systems use a method called vapor compression cycle. The vapor compression cycle is a method in which a compressor such as a piston compressor compresses a low-pressure refrigerant vapor. In a next stage, a condenser condenses the warm compressed vapor, resulting in a partial or complete condensation of the vapor. This condensed refrigerant then passes through a fine capillary tube or other constriction into a larger chamber at low pressure. As the refrigerant enters the larger chamber, it evaporates and absorbs heat, resulting in the vapor. This refrigerant vapor is then routed to the intake of the compressor, thus closing the cycle. This is the so-called closed loop refrigeration system.

A single stage refrigerant system is used to achieve temperatures up to −40 degree C. For temperatures in the range −50.degree C. to −80.degree C. a two-stage cascaded vapor compression system has been proposed. This method uses a single refrigerant per stage and two compressors, one for each stage. For still lower refrigeration temperatures, more cascaded stages are required. Typically, four stage cascade vapor compression systems are proposed for reaching cryogenic temperatures, lower than −150 degree C.

An advance in technology has been achieved by using a single compression system with a composition of refrigerants. This method has been used to achieve temperatures far below those that can be achieved using a cascaded multi-stage system, for example, the range −100 degree C. to −210 degree C. This method uses a composition of several refrigerants each of which with different boiling points.

The low temperatures can be achieved using different process systems, some employing one or more phase separators and some that don't employ any phase separators. Systems that employ phase separators are commonly known as multistage mixed refrigerant systems, and those that don't employ phase separators as single stage mixed refrigerant systems. In all the systems, the high pressure refrigerant is cooled to a low temperature and expanded to a low pressure to provide the necessary refrigeration to cool a load. The low pressure refrigerant leaving the evaporator provides the necessary refrigerant to cool the high pressure refrigerant to low temperatures.

Phase separators are employed to remove some of the high boiling point components and lubricating oil carried over from the compressor from reaching low temperatures where they may freeze. In the phase separators, the liquid consists mostly of the high boiling point components, and the vapour phase preferably does not contain any high boiling components. The liquid is expanded to a lower pressure, mixed with the low pressure refrigerant returning from the evaporator at an intermediate temperature and returned to the compressor. The expanded liquid also provides the necessary cooling to coo: and condense the vapour stream leaving the phase separator. The use of phase separators also allow balancing the refrigeration needed to cool the high pressure refrigerant at different temperatures.

Sometimes part of the refrigeration needed to cool the high pressure refrigerant is provided by another refrigerator or a cold stream. Such systems are known as precooled systems. Precooling can be used in both single and multistage mixed refrigerant systems. Precooling essentially allows the system to operate at nearly same efficiency at all ambient temperatures. The use of phase separators reduces the oil carried over to the low temperatures and improves the reliability of the system. The use of both phase separators and precooling improves the system reliability considerably by removing part of the oil carried over at low temperatures. The present invention relates to a refrigerant composition for multistage refrigeration systems precooled to a temperature at least 20 K below the ambient temperature, and more preferably precooled to a temperature of 230 to 260 K.

U.S. Pat. No. 5,441,658 describes a mixed refrigerant cycle with out phase separators. The patent claims the following mixture:

30 to 50 molar percent of nitrogen at least some but less than 20 molar percent of methane more than 30 molar percent of propane and balance ethylene or ethane.

U.S. Pat. No. 6,513,338 describes a precooled mixed refrigerant cycle, but with out any phase separators. The patent claims the following mixture:

0.06 mol/mol to 0.20 mol/mol propane, from 0.26 mol/mol to 0.36 mol/mol nitrogen and from 0.20 mol/mol to 0.38 mol/mol methane, the remainder being ethane.

As would be known to a person skilled in the art, the refrigerant composition depends on the type of system employed, the temperature at which precooling is done and whether phase separators are used or not. In a system with out phase separators, the refrigerant composition leaving the compressor is cooled in its entirety to the refrigeration temperature. On the other hand, in phase separator systems, part of the refrigerant returns back to the compressor at temperatures much above the refrigeration temperature. The refrigerant composition compressed by the compressor in phase separator systems therefore needs to be different from that used with out phase separators.

This disclosure is directed toward a composition of refrigerants for use in precooled multi stage mixed refrigerant systems to provide refrigeration below 110 Kelvin. Applications for such composition of refrigerants include household or commercial refrigeration systems such as refrigerators, freezers, electronic circuit cooling, medical applications, cryo-vacuum pumps, storing of biological specimens and tissues at low temperatures, cooling of Gamma-ray, Infra Red and X-ray detectors, cryosurgery and the like.

OBJECTS OF THE INVENTION

The main object of the present invention is to provide a refrigerant composition for refrigeration systems, more particularly precooled multistage mixed refrigeration systems with phase separators.

DETAILED DESCRIPTION OF THE PRESENT INVENTION

Figure 1:
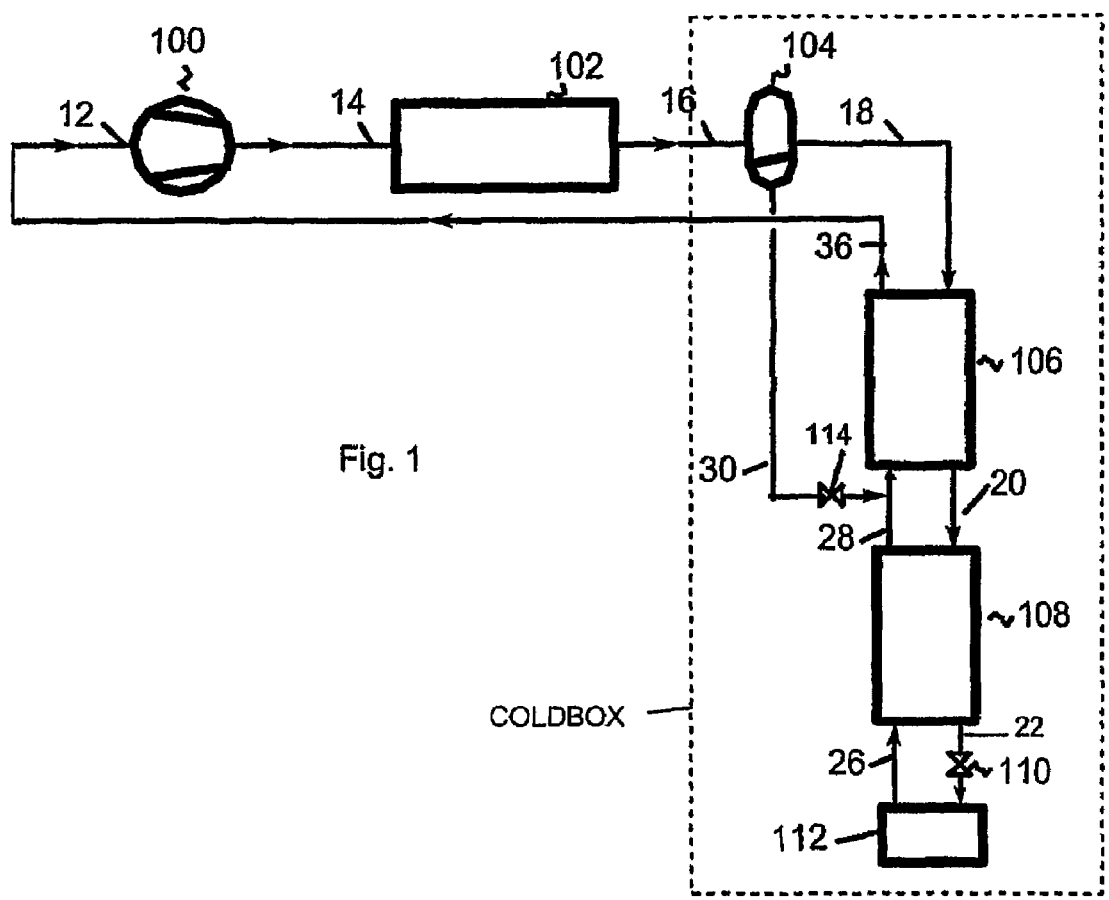
FIG. 1 shows a schematic diagram of a precooled multistage mixed refrigeration system as used with the refrigerant composition in the method of the invention.

Accordingly, the present invention provides a refrigerant composition which passes through a compressor of a precooled multi stage mixed refrigeration system with one or more phase separators comprising: more than 36 molar percent but less than 60 molar percent of Nitrogen, 15 to 40 molar percent of Methane, 5 to 30 molar percent of Ethane, Ethylene or combinations thereof, 0.1 to 20 molar percent of propane, n-Butane, Iso-Butane and combinations thereof, and up to 20 molar percent of Neon, Helium and combinations thereof.

In an embodiment of the present invention, the molar percent of nitrogen is preferably greater than 36 molar percent and less than 50 molar percent.

In another embodiment of the present invention, the molar percent of methane is preferably greater than 15 molar percent and less than 30 molar percent.

In yet another embodiment of the present invention, the molar percent of Ethane, Ethylene or combinations thereof is preferably in the range of 15 to 30 molar percent.

The Inventors have ascertained that a new combination of refrigerants as defined herein results in an efficient cooling system (higher refrigeration capacity, or higher efficiency or both) for precooled single and multistage mixed refrigerant systems with one or more phase separators. The advantages in using the disclosed refrigerant composition are illustrated with the help of four examples. The following are common for all the examples for a precooled multistage system shown in FIG. 1.

The system shown in FIG. 1 can largely be divided into two parts, those that operate at temperatures greater than the precooling temperature, say 230 K and those that operate lower than the precooling temperature. The parts of the system which are less than the precooling temperature is designated as the cold box in FIG. 1, for the sake of convenience (In reality all the parts below ambient temperature can be placed inside an insulated cold box). The low-pressure refrigerant composition (via line 12) is compressed in a compressor 100. The compressor can be a reciprocating, rotary piston, or other types normally employed in refrigeration and air conditioning systems. The compressed refrigerant leaving the compressor via line 14 is cooled to ambient temperature in an after cooler and further cooled to the precooling temperature in a precooling system. Appropriate oil separators needs to be used if oil lubricated compressors are used. The oil separation system, aftercooler and the precooling system are collectively designated as 102 in FIG. 1. Sometimes, a two stream heat exchanger, where heat transfer occurs between the high and low pressure mixed refrigerant streams, can also be used between the after cooler and the precooler. In the example shown in FIG. 1, no heat exchanger has been assumed between the precooling system and the aftercooler. Thus, the low pressure refrigerant leaving the mixed refrigerant system via line 12 is passed to the compressor directly.

A part of the high pressure refrigerant entering the cold box through line 16 is in the liquid phase and the rest in the vapour phase at this stage. The liquid and vapour phases are separated in a phase separator 104. The high pressure vapour separated in the phase separator is passed to the first of the two heat exchangers, 106. The liquid separated from the phase separator (line 30) is expanded and mixed with the low pressure stream in line 28. The high pressure vapour stream (line 18) is cooled to a low temperature in the two heat exchangers 106 and 108, and is expanded to a lower pressure in a throttling device 110. The low temperature and low pressure refrigerant provides the refrigeration to cool the load in the evaporator 112. The low pressure refrigerant leaving the evaporator 26 warms up in the two heat exchangers, and cools the high pressure refrigerant. The low pressure refrigerant leaving 106 is passed to the compressor where it gets compressed to a higher pressure, thus completing the cycle.

For the sake of simplicity, in the examples given below it has been assumed that no pressure drop occurs in the heat exchangers, evaporator, phase separators or connecting piping, the systems are well insulated, and the efficiency of the phase separator is 100%. The refrigerating temperature is considered to be the temperature of the refrigerant leaving the evaporator, and the ambient temperature is 300 K.

The exergy efficiency ($\eta_{ex}$) quoted is the internal exergy efficiency defined as follows:

$$\eta_{ex} = \frac{Q*(T_{ambient}/T_{evap,out} - 1)}{ex_{hp,in} - ex_{lp,out}}$$

where Q is the heat added to the refrigerant in the evaporator 112 in Joules per mol of refrigerant circulating through the system, $T_{ambient}$ and $T_{evap,out}$ are the ambient temperature and the temperature of the refrigerant leaving the evaporator respectively. The term $ex_{hp,in}$ refers to the exergy of the high pressure refrigerant leaving the precooler via line 16 and entering the coldbox of the multistage refrigeration system, and $ex_{lp,out}$ refers to the exergy of the low pressure stream leaving the refrigeration system to the compressor inlet via line 12, in Joules per mol.

The table shows the refrigerant compositions passing through the compressor of a precooled multistage refrigeration systems described above at different operating conditions. The minimum temperature difference in each of the heat exchanger and other operating/design conditions assumed to arrive at the above compositions is also given. The compositions were arrived at for a compressor with a certain volumetric efficiency characteristic. The compositions will be different when the operating/design conditions and hardware such as the compressor used are different.

EXAMPLES

The Inventors have worked out different combinations of the various ingredients present in the refrigerant composition that is being claimed in the present application. Four such combinations and the results obtained for these combinations are given here below by way of example.

TABLE 1

|  | Case-1 | Case-2 | Case-3 | Case-4 |
|---|---|---|---|---|
| Nitrogen (mol %) | 38.3 | 45.6 | 41.2 | 45.7 |
| Methane (mol %) | 29.9 | 22.9 | 25.5 | 27.9 |
| Ethane (mol %) | 27.7 | 25.7 | — | 19.9 |
| Ethylene (mol %) | — | — | 18.4 | — |
| Propane(mol %) | — | 0.5 | 11.9 | — |
| nButane (mol %) | — | 1.4 | — | — |
| Isobutane(mol %) | 4.2 | 1.0 | — | 5.9 |
| Neon(mol %) | — | 2.9 | 3.0 | — |
| Helium (mol %) | — | — | — | 0.6 |
| High pressure, $P_h$ (bar) | 20 | 20 | 20 | 20 |
| Low pressure, $P_l$ (bar) | 4.0 | 2.7 | 2.3 | 2.6 |
| Refrigerating temperature, $T_{evap,out}$ (K) | 100 | 88 | 88 | 90 |
| Precooling temperature (K) | 243 | 233 | 233 | 243 |
| Temperature at expansion valve inlet, $T_{JT,in}$ (K) | 108 | 96 | 96.1 | 98 |
| $\Delta T_{evap}$ (K) | 4.7 | 1.7 | 2.5 | 1.3 |
| $\Delta T_{min}$ (HX 106) (K) | 13.2 | 11.3 | 8.1 | 10.25 |
| $\Delta T_{min}$ (HX 108) (K) | 8.0 | 8.0 | 8.0 | 8.0 |
| Exergy efficiency, $\eta_{ex}$ | 0.4 | 0.4 | 0.51 | 0.45 |
| Refrigeration produced, Joules per litre of refrigerant compressed $Q_{ov}$ | 170 | 120 | 150 | 133 |
| Volumetric efficiency assumed, $\eta_v$ | 0.69 | 0.59 | 0.54 | 0.58 |
| $Q_{ov}*\eta_v$, J/litre | 117 | 70.8 | 81 | 77.2 |

In the above table, $\Delta T_{min}$ refers to the minimum temperature approach between the streams in the heat exchangers 106 or 108. $T_{JT,in}$ is the temperature of the high pressure stream entering expansion device 110 via line 22.

It is also possible to obtain even higher energy efficiencies and/or larger amount of refrigeration than that shown in Table 1 with appropriate changes to the refrigerant composition and/or the operating/design conditions such as the amount of subcooling of the refrigerant at the inlet of the expansion valve connected to the evaporator. The example shown is only illustrative of a precooled mixed refrigerant system with phase separators, and is not limiting the claims made. Many different combinations involving heat exchangers, phase separators can be devised. The composition specified in this specification are suitable for all those precooled mixed refrigerant system with phase separators.

The composition being claimed is workable only in precooled multistage mixed refrigerant system, although composition with minor changes could be workable in other refrigerant systems also but same has not been tried. It should be understood that the use of a refrigerant composition that falls within the claims in this specification is not to be taken in isolation, but in conjunction with other parameters such as those indicated below to achieve a high efficiency and high refrigeration. Only an appropriate composition can result in optimum performance. The efficiency and the quantity of refrigeration obtained from different systems depend not only on the type of refrigerant composition employed, but also on the hardware used as well as operating parameters such as the operating pressures used etc. The type of system to be employed (number of phase separators or heat exchangers to be used etc.) depends on several factors such as the temperature at which refrigeration is needed, type of lubricating oil used, type of oil separation/filtration systems used, compressor used, the quantity of refrigeration required, the type of precooler employed, the efficiency of the precooler etc. The optimum composition for one type of system may not be optimum for other type of systems, operating temperatures and pressures. The components used in the refrigerant composition also depend on other factors as well. For example, some refrigerant components may freeze at low temperatures. The complete refrigerant may also freeze at a certain temperature.

With an appropriate hardware and operating conditions, the refrigerant compositions claimed in this specification will result in high energy efficiency and/or high refrigeration. The methods to decide on the type of system to be employed, type of hardware and operating conditions and the components to be used in a composition, are generally known to those practicing the art of mixed refrigerant technology.

The examples in the Table provided are only for illustrative purposes and are not intended to be limiting the stage Claims made.

The Inventors would like to submit here that the composition of the present application is a synergistic composition exhibiting surprising and unexpected properties. This is clear from Table 2, which establish the synergistic effect of all the compositions, developed in the above four examples given in Table 1.

TABLE 2

| Ingredient | High pressure, ph (bar) | Low pressure, pl (bar) | Refrigerating Temperature achieved (K) | Exergy Efficiency (%) | RefrigeRation Q (J/l) |
|---|---|---|---|---|---|
| Nitrogen* (alone) | 20 | 1 | 77.2 | 0 | 0 |
| Methane (alone) | 20 | 1 | 111.5 | 3.96 | 8.7 |
| Ethane (alone) | 8 | 1 | 184.3 | 4.3 | 17.6 |
| Ethylene (alone) | 20 | 1 | 169.2 | 11.4 | 52.4 |
| Propane+ (alone) | <1.6 | 1 | 230.8 | — | — |
| Helium* (alone) | 20 | 1 | 4.2 | 0 | 0 |
| Neon* (alone) | 20 | 1 | 26 | 0 | 0 |
| Composition of case 1 | 20 | 4 | 100 | 40 | 170 |
| Composition of case 2 | 20 | 2.7 | 88 | 40 | 120 |
| Composition of case 3 | 20 | 2.3 | 88 | 51 | 150 |
| Composition of case 4 | 20 | 3.1 | 90 | 36 | 110 |

*No refrigeration is obtained with nitrogen, helium and neon with a minimum temperature approach of 8 K and a precooling temperature of 243 K.
+Vapour pressure of Propane at 243 K is 1.7 bar. Hence propane alone cannot be used as refrigerant in the cycle shown in FIG. 1 with precooling at 243 K.

Please note that the minimum temperature approach between the streams was assumed to be 8 K, the same assumed in all the cases in Table 1. The precooling temperature was assumed to be 243 K in the case of pure fluids.

The invention claimed is:

1. A method of refrigeration, comprising:
(a) providing a precooled multistage mixed refrigeration system comprising a compressor, an oil separator for separation of entrained oil from the refrigerant, and one or more refrigerant phase separators for separation of the liquid and vapor phases of the refrigerant; and
(b) operating the refrigeration system with a refrigerant composition comprising:
more than 36 molar percent but less than 60 molar percent of nitrogen,
15 to 40 molar percent of methane,
5 to 30 molar percent of ethane, ethylene or combinations thereof,
up to 20 molar percent of propane, n-butane, iso-butane and combinations thereof, and up to 20 molar percent of neon, helium and combinations thereof; wherein the refrigerant comprises at least one of iso-butane, neon, or helium.

2. The method of claim 1, wherein the molar percent of nitrogen is greater than 36 molar percent and less than 50 molar percent.

3. The method of claim 1, wherein the molar percent of methane is greater than 15 molar percent and less than 30 molar percent.

4. The method of claim 1, wherein the molar percent of ethane, ethylene or combinations thereof is in the range of 15 to 30 molar percent.

5. The method of claim 1 wherein the molar percent of helium is at least about 0.6%.

6. The method of claim 1 wherein the molar percent of neon is at least about 2.9%.

* * * * *